United States Patent Office 2,761,287
Patented Sept. 4, 1956

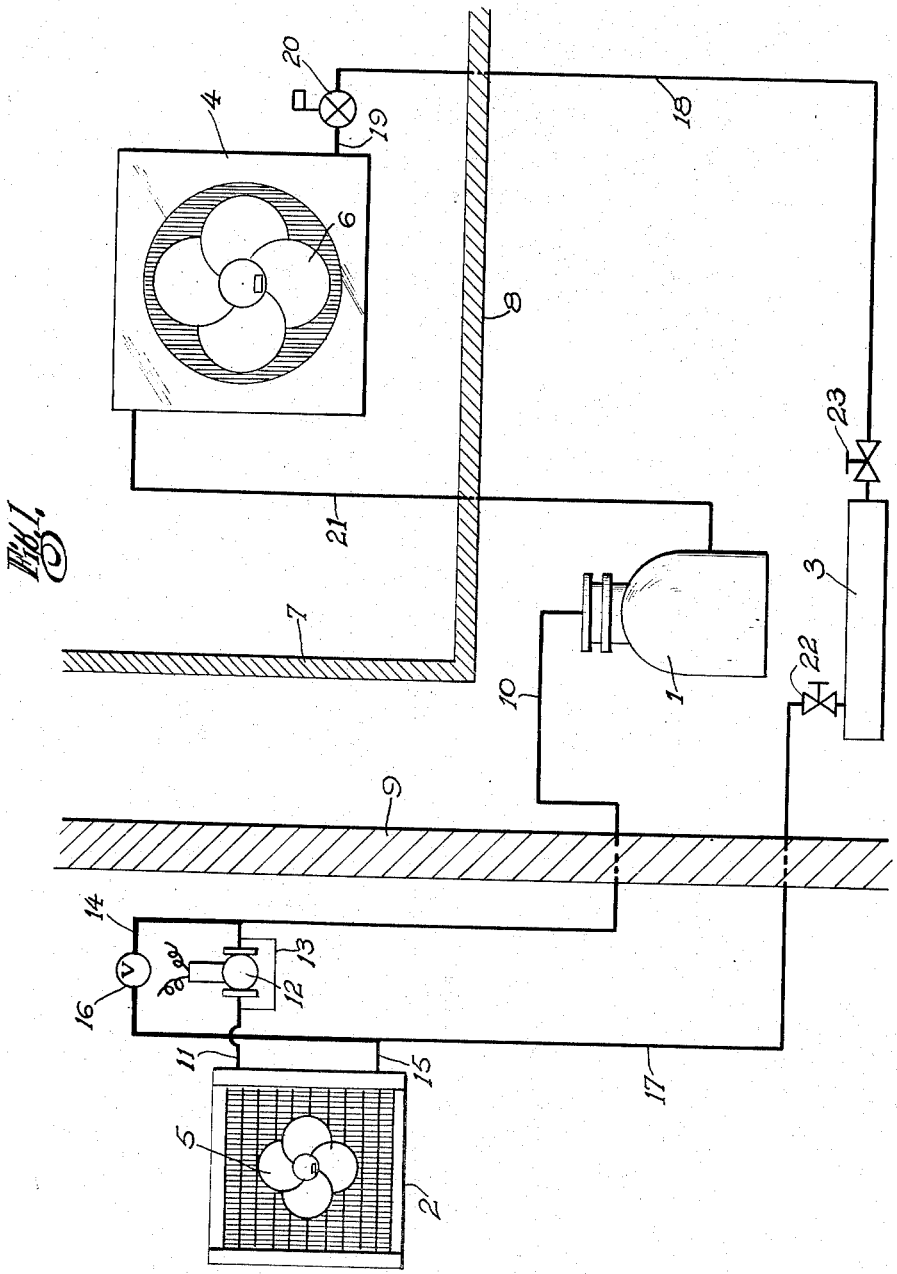

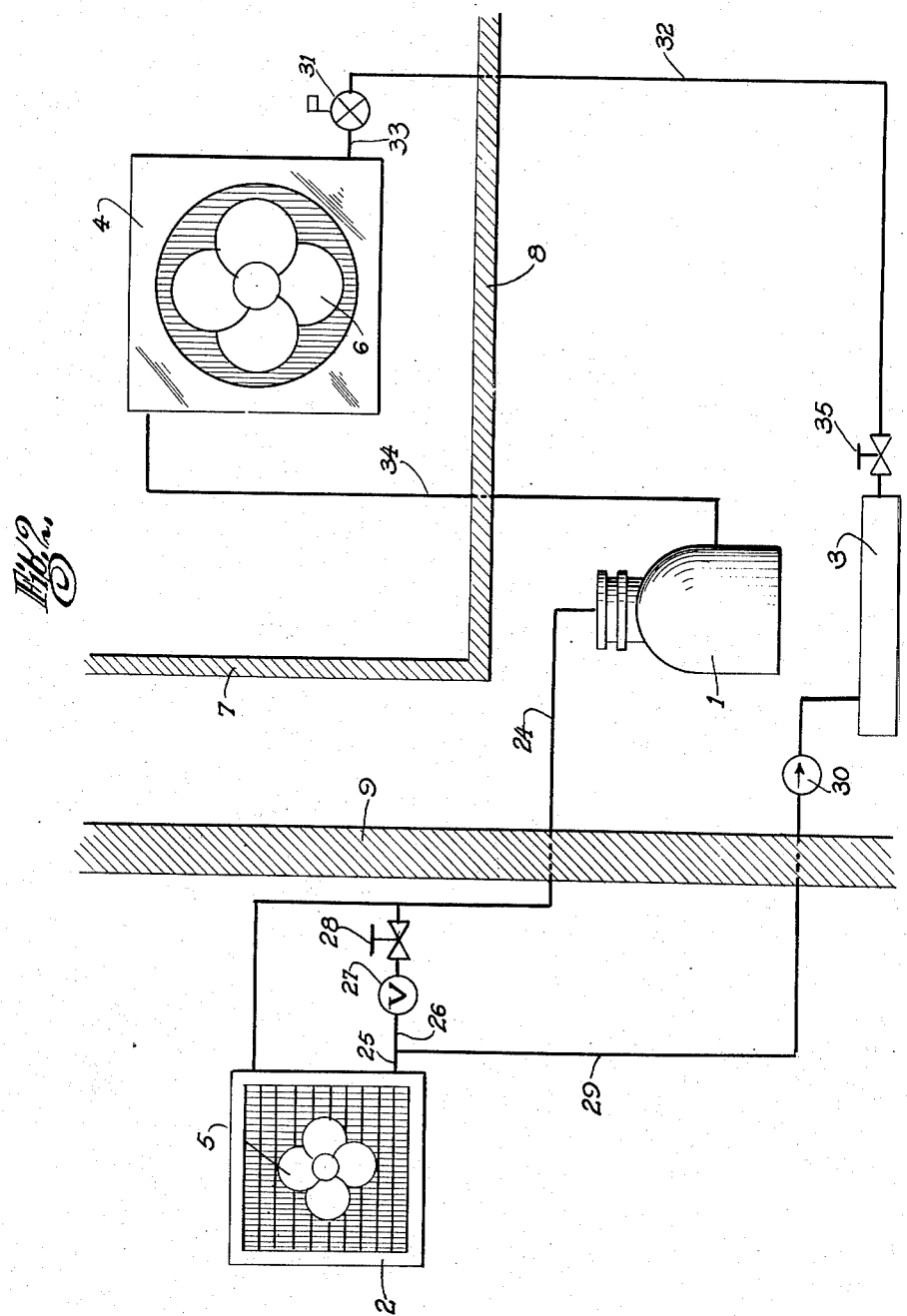

2,761,287

MEANS FOR CONTROLLING HIGH SIDE PRESSURE IN REFRIGERATING SYSTEMS

Hyman Malkoff, Levittown, Pa., and Otto J. Nussbaum, Trenton, N. J., assignors to Kramer Trenton Company, Trenton, N. J., a corporation of New Jersey Application June 25, 1953, Serial No. 364,042

4 Claims. (Cl. 62—3)

This invention relates to means for controlling the high side pressure in refrigerating systems, and has for an object to provide for regulating the level of the refrigerant in the condenser and correspondingly regulating the area of effective heat transfer surface inside the condenser.

Another object is to accomplish the above stated control by an arrangement which includes means for simultaneously supplying refrigerant to the inlet and the outlet of the condenser.

Another object is to provide such an arrangement which includes a device positioned intermediate and connected with the compressor discharge and the condenser, which device is designed and adapted to maintain an approximately constant pressure at its outlet side.

Another object is to provide such an arrangement in which the constant pressure device is connected to the outlet of the condenser.

Another object is to provide such an arrangement in which the constant pressure device is of the modulating type, such as a constant outlet pressure modulating valve.

Another object is to provide such an arrangement in which the constant pressure device is associated with a shut-off valve that is positioned in the hot gas conduit connecting the compressor discharge with the inlet of the condenser.

Another object is to provide such an arrangement in which the shut-off valve is fitted with means to permit a restricted flow even when the valve proper is closed.

Another object is to provide such an arrangement in which the control of high side pressure is automatically effective even though the condenser is located out-of-doors and subject to low ambient temperatures, and even though the heat load within the evaporator is subject to variations that affect pressure conditions.

A further object is to provide certain improvements in the form, construction and arrangement of the several parts, whereby the above named and other objects inherent in the invention may be effectively attained.

In brief summary, the invention is directed to refrigerating systems that include compressor, condenser and evaporator, and contemplates the automatic maintenance of an approximately constant pressure of predeterminable degree in the high side of the system, regardless of the cooling temperature affecting the condenser or the heat load in the evaporator, by regulating the area of effective heat transfer surface inside the condenser.

Practical embodiments of the invention are shown in the accompanying drawings, in which:

Fig. 1 diagrammatically represents the form that includes the shut-off valve; and Fig. 2 diagrammatically represents a modified form in which the shut-off valve is omitted.

It is known to refrigeration engineers that, in a given system under a given evaporator heat load, the head or high side pressure is related to the condensing temperature of the refrigerant within the condenser, while the latter is governed by the relative temperature of the condensing medium or coolant acting upon the condenser to abstract heat from the refrigerant gas therewithin and effect its condensation. Thus, for instance, if air is the coolant, as in air-cooled condensers, and also in evaporative condensers, any radical fall in the ambient temperature can and frequently does result in such a decrease of head or high side pressure as sharply to reduce refrigerating capacity by lessening the rate of feeding of refrigerant through the usual thermostatic expansion valve, and likewise deleteriously to affect defrosting of the evaporator by hot gas from the compressor. A similar condition can arise in the use of water as a coolant; and reduction in evaporator heat load will of itself occasion lessening of high side pressure in the system. The present invention is calculated to eliminate any such disadvantage or difficulty by automatic maintenance of satisfactory high side pressure regardless of ambient conditions to which the condenser is subjected, and heat load to which the evaporator is subjected.

It may be pertinent here to mention that the heat transfer characteristics of evaporator and condenser differ markedly in that complete flooding of the former with refrigerant, as compared with partial flooding, enhances its heat transfer capacity; while complete flooding of the condenser nullifies its heat transfer capacity by preventing the compressor discharge hot gas from contacting the inner surface of the condenser and being liquefied. It is thus evident that graduated flooding of the condenser will cause graduated reduction of its heat transfer capacity with corresponding increase in the head or high side pressure of the system, and that control of this condition in the condenser can serve to maintain a predetermined minimum head or high side pressure regardless of variations in the ambient temperature at the condenser or evaporator heat load.

Referring to the embodiment of the invention illustrated in Fig. 1 of the accompanying drawing, the compressor is denoted by 1, the condenser by 2, the receiver by 3, and the evaporator by 4. These parts may be of any well known or approved form and construction, and the condenser and evaporator are preferably fitted with the usual fans, marked 5 and 6 respectively, driven by motors (not shown) and also preferably automatically controlled by customary means (not shown). The evaporator 4 is shown as located within a refrigeration chamber, two walls of which are marked 7, 8; and the compressor and receiver are shown as located within a building structure, one wall of which is denoted by 9, that also houses the refrigeration chamber 7, 8; while the condenser is shown as located without the building and subject to outside ambient temperature.

The compressor discharge is connected by a hot gas conduit 10, that traverses the building wall 9, with the inlet 11 of the condenser, and a shut-off valve 12, shown as of the solenoid type, is positioned in the said hot gas conduit 10. The said valve 12 may be controlled, through the usual electric circuit, by a thermostat so positioned as to be responsive to outside temperatures affecting the condenser, and be adjusted so as to be open during normal temperatures, e. g. 60° F. or higher, and be closed under conditions of lower temperatures. As an alternative, the thermostat may be substituted by a pressurestat so positioned as to be responsive to the high side pressure of the system, the arrangement being such that the valve 12 is closed when the high side pressure drops below a predetermined degree for which the pressurestat has been set. Further, if desired, the valve 12 may be a manual valve that can be open during normal temperature, e. g., 60° F. or higher, and be closed when the temperature falls therebelow as, for instance, in winter. It will be understood that the temperature at which either of the above described automatic valves is operated may be predetermined by the installing or operating engineer and, of course, the temperature at which the manual valve is closed is subject to the judgment of the operator in charge of the system.

A restrictor tube 13 bridges the valve 12 so as to permit a restricted flow of hot gas refrigerant through the conduit 10 to the inlet 11 of the condenser 2 even when valve 12 is closed. The internal diameter of this tube 13 is selected so as to cause a pressure drop which is sufficient in magnitude to balance and hold up a column of liquid equal in height to the actual height of the condenser. Alternative known devices are available, such as the provision of a leak port in valve 12 which is open even when the valve is closed; or the substitution of a manual valve that never completely closes.

A branch conduit 14 connects the hot gas conduit 10 with the outlet 15 of the condenser, thus permitting refrigerant gas from the compressor discharge to by-pass both valve 12 and restrictor tube 13 and flow to the condenser at the outlet of the latter. In this branch conduit 14 is positioned a device 16 that is designed and adapted to maintain an approximately constant pressure at its outlet side, i. e., its side that is toward the condenser and is the outlet for refrigerant gas passing through the said device from compressor to condenser.

We prefer to use a constant outlet pressure modulating valve, but there may be substituted therefor other devices such as a constant pressure automatic expansion valve, or a solenoid valve combined with a pressure switch, or any other mechanism or combination thereof which will maintain its outlet or down-stream pressure at the desired predetermined degree. The device may be modulating or not and may be adjustable or factory pre-set; but, we prefer to use one that is modulating and adjustable.

The outlet 15 of the condenser is connected, as usual, by a conduit 17 with the inlet of receiver 3, the outlet of which is connected by the customary supply conduit 18 with the inlet 19 of the evaporator 4, a suitable pressure reducing device, such as a thermostatic expansion valve 20, being positioned in conduit 18 adjacent the evaporator. The outlet of the evaporator is in communication with the inlet of the compressor 1 by a suction conduit 21, as is the usual practice. Hand valves 22, 23, for servicing, are inserted in the conduits 17 and 18, respectively, at points close to the receiver 3; and it will be observed that the conduit 17 passes through the building wall 9 while the conduits 18 and 21 pass through the wall 8 of the refrigeration chamber.

In the use of this system during normal temperature, which may be exampled by a temperature of, say, 60° F. or higher, the valve 12 is open and pressure conditions at inlet 11 of the condenser may be expected to be such that the valve 16 is closed. Hence the hot refrigerant gas from the compressor discharge will flow through the conduit 10 and the valve 12, enter the condenser 2 at its inlet 11, be condensed therein and pass from outlet 15 through conduit 17 into the receiver 3, from which latter the warm but condensed refrigerant will flow through supply conduit 18 to expansion valve 20 wherein such pressure reduction will take place as to cause the refrigerant to enter evaporator 4 in the form of cool liquid and gas. The usual vaporization of the cool liquid with its chilling effect upon the refrigeration chamber will take place in the evaporator and the vaporized refrigerant will flow from the latter through the suction conduit 21 to the compressor inlet for recompression and recirculation all as is familiar to those skilled in this industrial field.

If, now, the ambient temperature at the condenser 2 falls below 60° F., or such other degree of temperature as may have been selected for the closing of valve 12 and the opening of valve 16, the former will be closed by the thermostat, while the pressure at the outlet side of valve 16 will be reduced causing this valve to open and supply an amount of hot refrigerant gas to the condenser outlet, with the result that gas will be flowing to the condenser at both its inlet and outlet because a restricted amount will pass through tube 13 to inlet 11 even though valve 12 be closed. The restricting effect of tube 13 will, however, cause the pressure in branch conduit 14 at the outlet of the condenser to be higher than the pressure in the condenser outlet 15 and the liquid resulting from condensation will accumulate in the condenser until it floods the interior of the latter to such an extent as to reduce the area of its effective heat transfer surface and thereby raise the pressure at the outlet side of valve 16 sufficiently to cause the latter to close; whereupon the continued action of the compressor will cause the condensed refrigerant to be withdrawn from the condenser to the receiver and flow to the evaporator for the normal refrigerating function.

It will thus be seen that the accelerated functioning of the condenser due to lower ambient temperature, resulting in reduced pressure at the outlet side of valve 16, will be counterbalanced by reduction in the area of its internal heat transfer surface; and, as the difference in operating pressure across valve 16 is slight, i. e., two to five pounds per square inch, the effect of the said valve in maintaining a nearly constant pressure at its outlet side results in the maintenance of a nearly or approximately constant pressure throughout the high side of the system, i. e., from compressor discharge to the thermostatic expansion valve 20. As already indicated, when the flooding of the condenser resulting from the flow of refrigerant to both its inlet and outlet has served the purpose of reducing the area of internal heat transfer surface to the needed extent, valve 16 will close due to rise in pressure at its outlet and the condensed refrigerant will resume its outflow through conduit 17 to receiver 3. Thus, a constant balance is automatically maintained between the effective ambient temperature and the effective heat transfer surface area of the condenser to obtain the objective of constant high side pressure in the system, and the refrigerant reaches the expansion valve 20 at a pressure sufficient to cause flooding of the evaporator 4 regardless of low ambient temperature at the condenser.

The effects just recited as resulting from drop in ambient condenser temperature will also be occasioned by drop in heat load of the evaporator, because that will reduce pressure at the condenser and the outlet of valve 16 even in the absence of the temperature drop.

It may happen that the flooding of the condenser will, at some stage, cause such a lessening of its normal pressure drop, i. e., two pounds or more per square inch, between its inlet and outlet that the valve 16 will tend to close when it is desired that the same should be open; but, in such instances, the only flow of hot gas refrigerant to the condenser inlet 11 is through the restrictor tube 13 because valve 12 is closed, and this condition establishes the necessary reduction in pressure at the outlet side of valve 16 to keep it open regardless of the degree to which the condenser is flooded or the size of the operating pressure drop across the condenser.

It should be mentioned that the valve 16 is located above the flooding level of the condenser in order to avoid the possibility of the existence of any liquid head on its outlet side which might hamper its proper functioning with respect to opening and the supplying of a modulated amount of refrigerant gas to the condenser outlet.

The functioning of the parts will be substantially the same regardless of which specific alternative structure is used for the valve 12 and/or the valve 16; except that, if valve 12 is hand operated, it should be closed at the approach of cold weather and opened at the approach of warm weather.

In now referring to the modified form of the invention shown in Fig. 2, it should preliminarily be mentioned that the shut-off valve 12 and restrictor tube 13, or an equivalently functioning device, may not always be a necessary element of the system especially if the constant outlet pressure valve 16 is of a type or construction which operatively opens in the presence of a very low pressure differential between its inlet and outlet, i. e., something less than two pounds per square inch, it being a fact that some forms of such constant outlet pressure valves require as little as about one-half pound pressure differential for satisfactory operation. Accordingly, in the modified form of Fig. 2, the system omits the elements 12 and 13 of Fig. 1, while maintaining the constant outlet pressure valve that is in communication with the outlet of the condenser.

In the showing of Fig. 2, the compressor, condenser, receiver, evaporator, condenser fan, evaporator fan, refrigeration chamber walls, and building structure wall are all marked with the numerals 1 to 9, inclusive, respectively, as in Fig. 1, because there is no difference in the construction or arrangement of the said parts. The remaining elements of the system as presented in Fig. 2 will receive new numbers because of some differences. Thus, the hot gas conduit which leads from the discharge of compressor 1 to the inlet of condenser 2 is denoted by 24, and the branch conduit leading from the said hot gas conduit to the outlet 25 of the condenser is marked 26; while the constant outlet pressure valve, that corresponds to valve 16 of Fig. 1, is indicated by 27. We have found it advisable to install a shut-off valve in the branch conduit 26 at the inlet side of valve 27, the same being shown as a manually operated valve 28 although an automatic valve, such as a solenoid valve, either pressure or temperature controlled, could be substituted if desired. The purpose of this valve 28 is to prevent any undesirable effect resulting from the possible opening of valve 27 in warm weather, which opening might adversely affect the heat transfer capacity of the condenser when its maximum capacity is needed.

The outlet 25 of the condenser is connected as is customary with the inlet of receiver 3 by a conduit 29, in which latter is desirably positioned a check valve 30 that permits flow to the receiver but inhibits back flow therefrom; the purpose of the said valve being to assist in maintaining refrigerant pressure at the thermostatic expansion valve, here marked 31, at a high level during periods when the compressor is not operating and condenser pressure falls; thus enabling a rapid rise to the desired head pressure in the system when the compressor restarts in operation.

The supply conduit from the receiver 3 to expansion valve 31 is denoted by 32; the inlet of the evaporator 4 by 33; the usual suction conduit connecting evaporator outlet with compressor inlet by 34; and a servicing hand valve in conduit 32 by 35.

The functioning of this form of the invention exhibited in Fig. 2 is the same as that of the form shown in Fig. 1 with the elimination of the activity of valve 12 and tube 13 that are included in Fig. 1; and with the addition of the effects of shut-off valve 28 and check valve 30 above described. It is thus deemed unnecessary to repeat the description of the operation of the system other than to restate the facts that the form of Fig. 2 is particularly adapted to arrangements in which the operative pressure differential between the inlet and outlet of valve 27 is very low, such, for instance, as less than two pounds per square inch. In this connection it may also be mentioned that it is possible so to design and construct the condenser 2 that it may have a comparatively high friction drop during operation without substantially affecting its heat transfer capacity at maximum loads; which provision would also eliminate the necessity of including valve 12 and tube 13 shown in Fig. 1, or an equivalently functioning device.

Referring to both forms of the invention, it should be stated that, when the valve 16 or 27, as the case may be, opens and permits refrigerant gas to flow to the outlet of the condenser, the gas does not necessarily actually enter the condenser. It may to some extent or it may not, and it may not even reach the condenser. But, in any event, the flow of the gas to the condenser outlet establishes a pressure condition which restrains the outflow of condensed refrigerant from the condenser and thus causes the accumulation of liquid in the condenser to reduce its area of effective heat transfer surface, as above explained. It is in this sense that, in the specification we describe and in the claims we call for, a branch conduit adapted to permit the flow of refrigerant gas to the condenser outlet under certain conditions, and we do not intend that language to be limited by the understanding that the gas actually enters the condenser or even reaches the outlet thereof; it being sufficient that the gas flow establishes the above mentioned pressure condition at the outlet of the condenser.

We desire it to be understood that various changes may be resorted to in the form, construction, material and arrangement of the several parts of the system without departing from the spirit or scope of the invention, and hence, we do not intend to be limited to details herein shown or described except as the same may be included in the claims or be required by disclosures of the prior art.

What we claim is:

1. In a refrigerating system including interconnected compressor, condenser, evaporator, and a pressure reducing device positioned in operative relationship to the evaporator inlet, means for automatically preventing the pressure in the high side of the system adjacent the said pressure reducing device from falling below a predetermined minimum, regardless of ambient temperature at the condenser or heat load in the evaporator, by controlling the level of the liquid refrigerant in the condenser, said means comprising, a hot gas conduit connecting the compressor discharge with the condenser inlet, a branch conduit connecting the hot gas conduit with the condenser outlet, automatic constant outlet pressure flow controlling means in the branch conduit operatively subject to pressure in said conduit between said controlling means and the condenser outlet for establishing temporary pressure conditions at the outlet to restrain outflow of condensed refrigerant whenever condenser pressure drops below a predetermined minimum degree, together with means at the condenser inlet for restricting flow thereto to establish a predetermined pressure drop for cooperating with the flow controlling means in the branch conduit in establishing the above named temporary pressure conditions at the condenser outlet.

2. A system as defined in claim 1, in which the means for restricting flow to the condenser inlet has a reduced internal diameter as compared with the hot gas conduit.

3. A system as defined in claim 2, in which the means for restricting flow includes a restrictor tube, and which also includes an open and shut valve in bridge relationship with the tube.

4. A system as defined in claim 1, which also includes an open and shut valve in the branch conduit.

References Cited in the file of this patent

UNITED STATES PATENTS

| | | |
|---|---|---|
| 1,860,447 | Bergdoll | May 31, 1932 |
| 2,525,560 | Pabst | Oct. 10, 1950 |
| 2,564,310 | Nussbaum et al. | Aug. 19, 1951 |
| 2,621,051 | Kramer | Dec. 9, 1952 |